(12) United States Patent
Nagoya et al.

(10) Patent No.: US 8,417,769 B2
(45) Date of Patent: Apr. 9, 2013

(54) GATEWAY HAVING DISTRIBUTED PROCESSING FUNCTION, AND COMMUNICATION TERMINAL

(75) Inventors: Koichi Nagoya, Gumma (JP); Masaaki Kimura, Gumma (JP)

(73) Assignee: Nakayo Telecommunications, Inc., Gumma (JP)

( * ) Notice: Subject to any disclaimer, the term of this patent is extended or adjusted under 35 U.S.C. 154(b) by 0 days.

(21) Appl. No.: 13/061,874

(22) PCT Filed: Dec. 18, 2009

(86) PCT No.: PCT/JP2009/007002
§ 371 (c)(1),
(2), (4) Date: Mar. 2, 2011

(87) PCT Pub. No.: WO2010/070919
PCT Pub. Date: Jun. 24, 2010

(65) Prior Publication Data
US 2011/0158227 A1   Jun. 30, 2011

(30) Foreign Application Priority Data

Dec. 19, 2008 (JP) ................................. 2008323915

(51) Int. Cl.
*G06F 15/16* (2006.01)
(52) U.S. Cl. ........ 709/203; 709/227; 709/231; 370/352; 370/356

(58) Field of Classification Search .................... 709/203
See application file for complete search history.

(56) References Cited

U.S. PATENT DOCUMENTS

| 5,533,026 | A | 7/1996 | Ahmadi et al. | |
|---|---|---|---|---|
| 2003/0219023 | A1 | 11/2003 | Miyata et al. | |
| 2004/0139209 | A1* | 7/2004 | Mussman et al. | 709/230 |
| 2005/0091407 | A1* | 4/2005 | Vaziri et al. | 709/246 |
| 2008/0123535 | A1* | 5/2008 | Saito et al. | 370/241 |
| 2009/0280789 | A1* | 11/2009 | Takuno et al. | 455/418 |

FOREIGN PATENT DOCUMENTS

| JP | 08274792 | 10/1996 |
|---|---|---|
| JP | 2001156856 | 6/2001 |
| JP | 2003348173 | 12/2003 |
| JP | 2008040718 | 2/2008 |

\* cited by examiner

*Primary Examiner* — Tauqir Hussain
(74) *Attorney, Agent, or Firm* — Stoel Rives LLP

(57) ABSTRACT

Conventionally, in a system where devices for handling multiple media data such as audio and video are present, there is a problem that the number of audio channels that can be processed at the gateway is limited. In light of this problem, this invention offers a gateway having distributed processing function for a telephone or a data processing system featuring the capability to request address conversion to another terminal within the system to replace the address of stream-type packet data such as audio and video meant for itself, and if the aforementioned terminal to which the request was sent responds that it can handle the requested processing, to notify the address of the terminal processing the address conversion to the terminal transmitting the stream-type packet data.

4 Claims, 10 Drawing Sheets

FIG. 3

| Transmission block | | | IP data | | |
|---|---|---|---|---|---|
| IP data transmitter | Direction | IP data receiver | Destination IP address | Originating IP address | Audio relay IP address |
| Telephone Terminal 60 | → | SIP Server 40 | LA3 | LA4 | – |
| SIP Server 40 | → | Gateway 50 | LA2 | LA3 | LA2 |
| Gateway 50 | → | Router 30 | GA1 | LA2 | LA5 |
| Router 30 | → | Partner Telephone Terminal 20 | GA1 | GA2 | LA5 |

FIG. 4

| IP data transmitter | Transmission block Direction | IP data receiver | Destination IP address | IP data Originating IP address | Audio relay IP address |
|---|---|---|---|---|---|
| Partner Telephone Terminal 20 | → | Router 30 | GA2 | GA1 | LA5 |
| Router 30 | → | Telephone Terminal 61 | LA5 | GA1 | LA5 |
| Telephone Terminal 61 | → | Telephone Terminal 60 | LA4 | LA5 | LA5 |

FIG. 5

| IP data transmitter | Transmission block | | IP data | | |
|---|---|---|---|---|---|
| | Direction | IP data receiver | Destination IP address | Originating IP address | Audio relay IP address |
| Telephone Terminal 60 | → | Telephone Terminal 61 | LA5 | LA4 | LA5 |
| Telephone Terminal 61 | → | Router 30 | GA1 | LA5 | LA5 |
| Router 30 | → | Partner Telephone Terminal 20 | GA1 | GA2 | LA5 |

GATEWAY HAVING DISTRIBUTED PROCESSING FUNCTION, AND COMMUNICATION TERMINAL

RELATED APPLICATION

This application claims priority under 35 U.S.C. §371 to International Application No. PCT/JP2009/007002, filed Dec. 18, 2009, which claims priority to Japanese Patent Application No. 2008-323915, filed Dec. 19, 2008, each of which is hereby incorporated by reference herein in its entirety.

TECHNICAL FIELD

This invention relates to gateways and communication terminals that distribute the address conversion process when the traffic of stream-type packet data such as audio and video increases.

BACKGROUND

When handling heavy load stream-type packet data such as audio and video, there is sometimes a gateway installed in the system dedicated for processing stream-type packet data.

In such a case, processing stream-type packet data for the system entirely at the gateway may reduce the processing load of other devices; however, a new problem arises in which it sets a limit to the maximum traffic load that a gateway can process.

On the other hand, Patent Document 1 discloses a technology for servers to monitor their processing loads themselves and to distribute the load to other servers when it exceeds a threshold.

REFERENCE

Patent Document
Patent Document 1: Bulletin 2008-040718 (JP)

SUMMARY OF THE INVENTION

Problems Solved by the Invention

However, if the same approach is applied to the aforementioned gateways, it creates problems in implementation, as it requires a backup gateway to be installed in advance. This invention aims to eliminate the need to add new devices by distributing heavy processing loads from stream-type packet data such as audio and video.

Means of Solving the Problems

This invention has been designed to solve the above-stated problems, and its goal is to provide a gateway that configures a telephone or a data system; features the capability to request address conversion to another terminal within the system to replace the address of stream-type packet data such as audio and video meant for itself; and if the aforementioned terminal, to which the request was sent, responds that it can handle the requested processing, notifies the address of the terminal processing the address conversion to the terminal transmitting the stream-type packet data.

Technical Advantages

By using this invention, a telephone or a data processing system can distribute the increased load on a particular gateway, caused by an increase in stream-type packet data such as audio and video, thereby effectively eliminating the need for adding a backup gateway.

BRIEF DESCRIPTION OF THE FIGURES

The invention may be more readily described with references to the accompanying figures:

FIG. 3 is a table showing IP addresses of connection request data of an embodiment of the invention.

FIG. 4 is a table specifying IP addresses of audio data (No. 1) of an embodiment of the invention.

FIG. 5 is a table specifying IP addresses of audio data (No. 2) of an embodiment of the invention.

DETAILED DESCRIPTION OF THE PREFERRED EMBODIMENT

Assuming that the communication terminals in this invention are telephone terminals, we describe the best way to implement the invention.

First Embodiment

Figure 1:
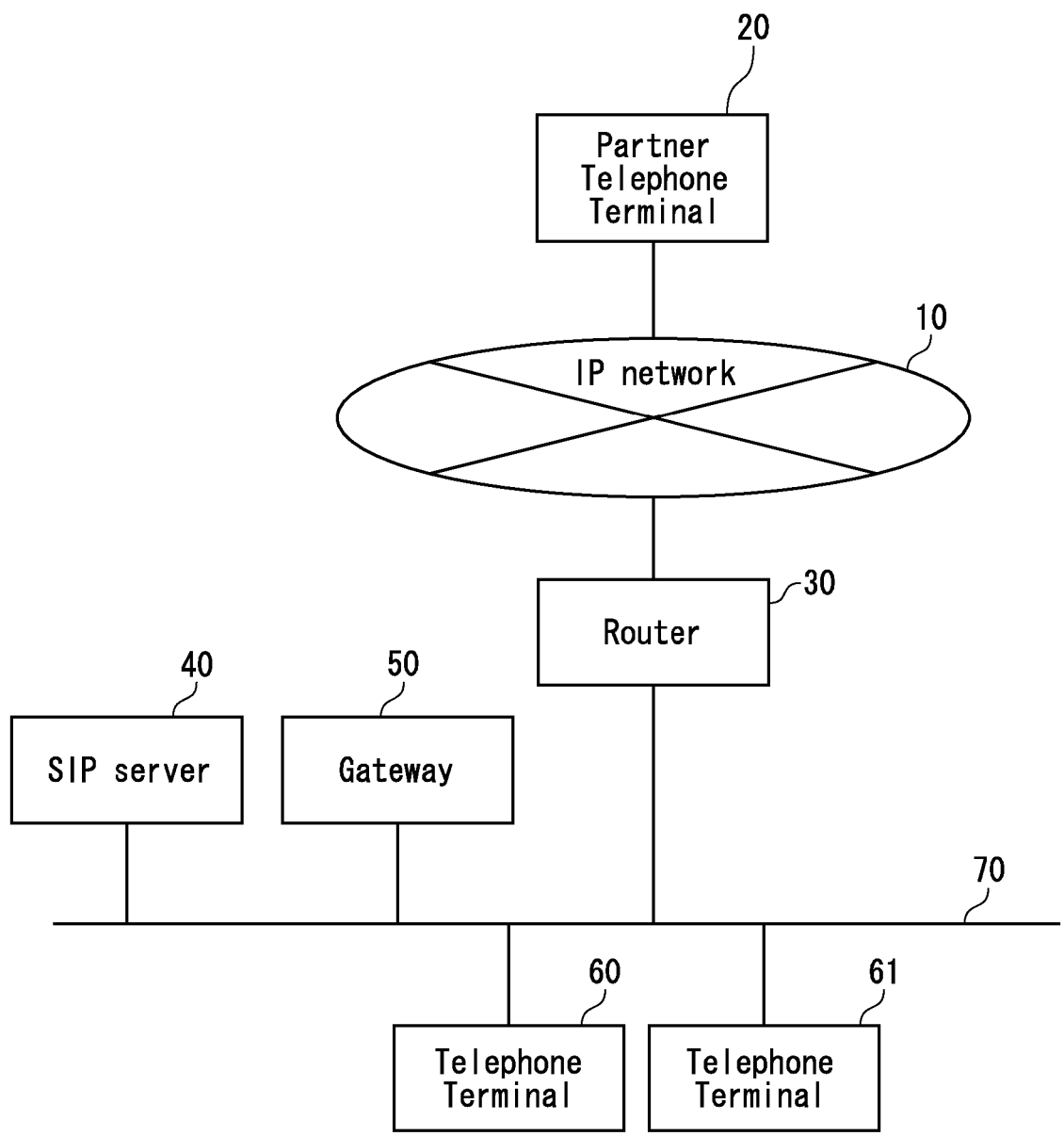
FIG. 1 illustrates an overall configuration of the distributed processing gateway and telephone terminals of an embodiment of the invention.

FIG. 1 shows the overall configuration of a telephone system including a gateway with distributed processing function and telephone terminals of an embodiment of the invention.

As shown in the figure, the telephone system comprises a LAN 70 connected to Telephone Terminals 60 and 61, an SIP server 40 that controls the overall telephone functions relevant to terminals 60 and 61, and Gateway 50 that performs address conversion for terminals 60 and 61 to communicate with other terminals on the IP network.

Furthermore, Router 30 between IP Network 10 and LAN 70 routes the traffic of data packets exchanged between the two.

There is another Telephone Terminal (hereinafter referred to as "Partner Telephone Terminal 20") connected to the IP Network 10 with which Telephone Terminal 60 communicates. Partner Telephone Terminal 20 can be a telephone system with an SIP server or a telephone terminal that is connected via another network.

Next, we describe the procedure for establishing communication when Telephone Terminal 60 calls Partner Telephone Terminal 20 across IP Network 10 passing through a conventional Gateway 50.

First, Telephone Terminal 60 sends a connection request to SIP Server 40, which then relays the request to Partner Telephone Terminal 20 via Gateway 50 and Router 30.

The connection request is appended with an audio relay IP address at the time it is relayed by SIP Server 40. Here the audio relay IP address refers to the IP address of relay equipment (hereinafter referred to as the "gateway function") that converts the IP address for the audio data, i.e., Gateway 50.

Upon receipt of the connection request, Partner Telephone Terminal 20 stores the IP address of Gateway 50 and sends a response of "ready for connection (200 OK)" to SIP Server 40 via Router 30 and Gateway 50. SIP server 40 sends the "ready for connection (200 OK)" to Telephone Terminal 60 that has sent the connection request.

Then, once Partner Telephone Terminal 20 is in the on-hook state and a call connection request attached with an audio relay IP address is executed, an exchange of audio data between Telephone Terminal 60 and Partner Telephone Terminal 20 will be performed via Gateway 50.

In particular, upon receipt of audio data from Telephone Terminal 60, Gateway 50 performs an audio data or address conversion (hereinafter collectively referred to as "address conversion") for Partner Telephone Terminal 20 and transmits it to Partner Telephone Terminal 20. As for audio data received from Partner Telephone Terminal 20 via Router 30, it performs address conversion for Telephone Terminal 60 and transmits it to the terminal.

Here in the present system configuration, SIP Server 40, Gateway 50, and Telephone Terminals 60 and 61 are independent; however, note that the system may be, for example, a telephone terminal with an SIP server function or a telephone terminal with a gateway function.

Figure 2:
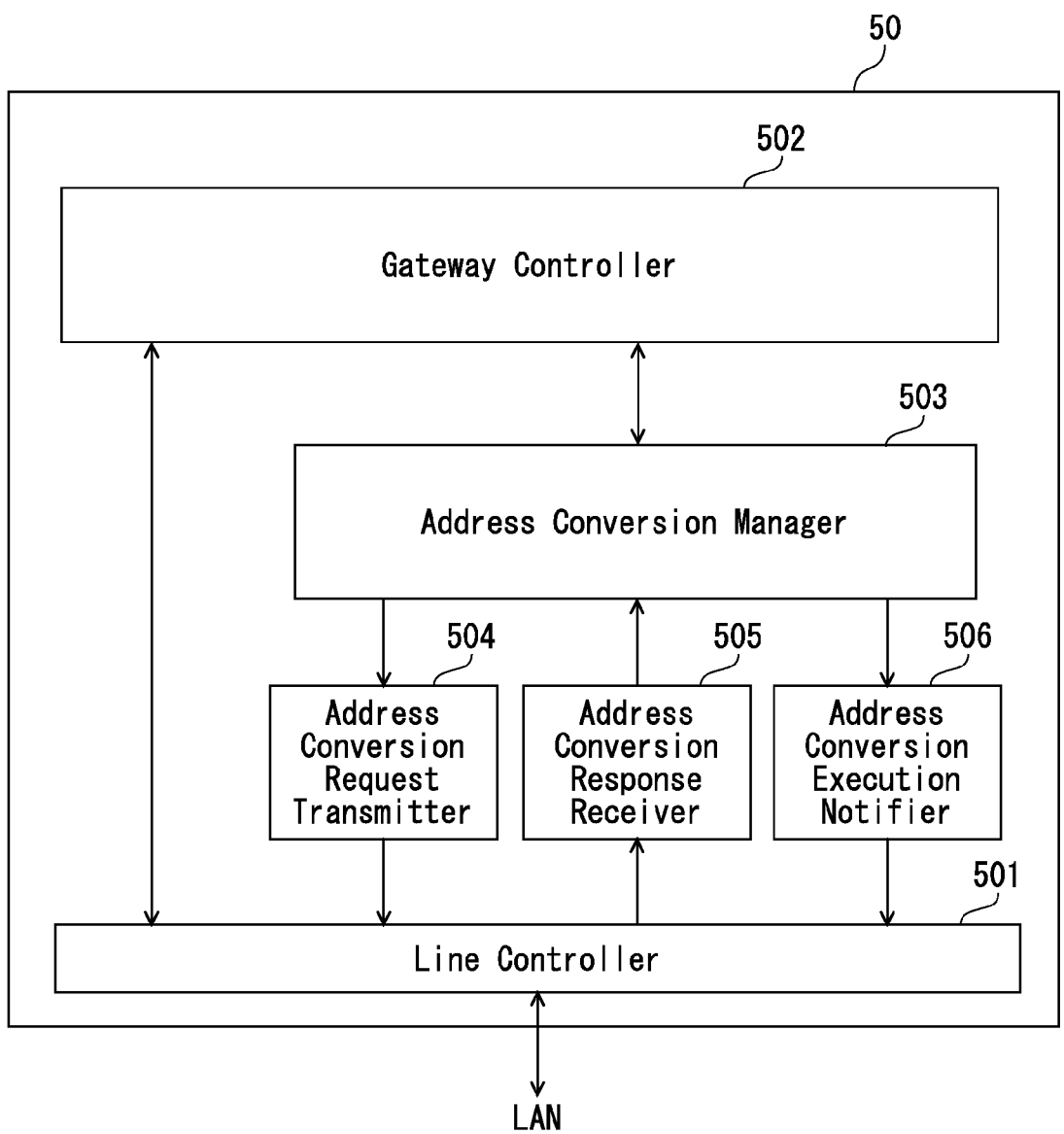
FIG. 2 is a block diagram showing the configuration of a distributed processing gateway of an embodiment of the invention.

FIG. 2 is a block diagram showing the configuration of each block in Gateway 50.

As shown in the diagram, Gateway 50 consists of Line Controller 501, Gateway Controller 502, Address Conversion Manager 503, Address Conversion Request Transmitter 504, Address Conversion Response Receiver 505, and Address Conversion Execution Notifier 506.

Line Controller 501 transmits and receives IP data in coordination with Gateway Controller 502.

Gateway Controller 502 executes conversion between a local area IP address and a global IP address when Telephone Terminal 60 or 61 exchanges data with IP Network 10 via Router 30. In addition, upon receipt of a connection request from Telephone Terminal 60 or 61, Gateway Controller 502 stores the audio relay IP address (the IP address of Gateway 50) and notifies Address Conversion Manager 503 that it has received a connection request.

When Address Conversion Manager 503 receives the notification, it sends an address conversion request under the control of the telephone system to a telephone terminal other than Telephone Terminal 60; here it is Telephone Terminal 61 in coordination with Address Conversion Request Transmitter 504 to take over the gateway function.

Although not shown in the illustrated embodiment, Address Conversion Manager 503 specifically monitors the performance of the gateway, and if it determines that the gateway does not have the processing capacity to perform address conversion on its own, it instructs Address Conversion Request Transmitter 504 to substitute the gateway function.

Upon receipt of the instruction, Address Conversion Request Transmitter 504 generates an address conversion request and sends it to SIP Server 40 through Line Controller 501.

Although Telephone Terminal 61 is featured in this embodiment as a terminal with a gateway function, it can also be another gateway or other terminal with a gateway function (e.g., a personal computer with a gateway function).

Upon receipt of the address conversion request, Telephone Terminal 61 sends back a response to accept the address conversion (hereinafter referred to as "address conversion response") if it has enough capacity to perform the address conversion.

Upon receipt of the address conversion response, Address Conversion Response Receiver 505 reports the reception of address conversion response to Address Conversion Manager 503 together with the IP address of the originator of the address conversion response (the IP address of Telephone Terminal 61). When Address Conversion Manager 503 receives the notification, it instructs Gateway Controller 502 to replace the audio relay IP address contained in the connection request with the IP address of Telephone Terminal 61.

Upon receipt of the instruction, Gateway Controller 502 converts the IP address of Gateway 50 in the connection request, which will be sent to Partner Telephone Terminal 20, to the address of Telephone Terminal 61 before sending it to Partner Telephone Terminal 20.

This allows Gateway Controller 502 to instruct Address Conversion Execution Notifier 506, via Address Conversion Manager 503, to send an address conversion notice to Telephone Terminal 60 to notify that the audio relay IP address in the connection request has been converted to the IP address of Telephone Terminal 61.

Here the address conversion notice means, when Partner Telephone Terminal 20 sends the connection ready response (200 OK) to Telephone Terminal 60 relayed by the gateway, to convert the audio relay IP address that gave the connection ready response to the IP address of Telephone Terminal 61.

As illustrated above, Gateway 50 can exchange data with IP Network 10 using its own IP address conversion function, can monitor the data traffic received and transmitted by Telephone Terminal 60, and when it receives a connection information, it can request address conversion to another terminal, i.e., Telephone Terminal 61, enables the gateway function of address conversion for Telephone Terminal 60, and receives a response from Telephone Terminal 61, informing that the gateway function has been enabled.

FIGS. 3, 4, and 5 are tables specifying the IP addresses of the transmission data of an embodiment of the invention.

FIG. 3 illustrates the transition of connection request (IN-VITE) between devices when Telephone Terminal 60 calls Partner Telephone Terminal 20. The request is sent from Telephone Terminal 60 to SIP Server 40, then through Gateway 50, Router 30, and to Partner Telephone Terminal 20. As shown in FIG. 3, for each transmission block field 310, the IP data field 311 is attached. An IP data field 311 consists of destination IP address field 312, originator IP address field 313, and audio relay IP address field 314.

Record 315 is the IP data sent from Telephone Terminal 60 to SIP Server 40. In the illustrated embodiment, the destination IP address field 312 of the IP data block contains the data "LA3," which is the local IP address of SIP Server 40; the originator IP address field 313 contains the data "LA4," which is the local IP address of Telephone Terminal 60; and the audio relay IP address field 314 contains no data.

Record 316 is the IP data sent from SIP Server 40 to Gateway 50. In the illustrated embodiment, the destination IP address field 312 of the IP data block contains the data "LA2," which is the local IP address of Gateway 50; the originator IP address field 313 contains the data "LA3," which is the local IP address of SIP Server 40; and the audio relay IP address field 314 contains the data "LA2," which is the local address of Gateway 50.

Record 317 is the IP data sent from Gateway 50 to Router 30. In the illustrated embodiment, the destination IP address field 312 of the IP data block contains the data "GA1," which is the global IP address of Partner Telephone Terminal 20, and the originator IP address field 313 contains the data "LA2," which is the local IP address of Gateway 50. The audio relay IP address field 314 in the data to be sent conventionally contains the data "LA2," which is the local address of Gateway 50; however, this invention replaces it with the local address of Telephone Terminal 61, "LA5," to distribute the gateway function to Telephone Terminal 61.

Record 318 is the IP data sent from Router 30 to Partner Telephone Terminal 20. Upon receipt of the connection request, Router 30 changes the originator IP address field 313 to "GA2," which is the global address of Router 30, before sending the connection request to Partner Telephone Terminal 20.

FIG. 4 lists the IP data of audio data sent from Partner Telephone Terminal 20 to Router 30, which is then passed on to Telephone Terminal 61 and to Telephone Terminal 60. Partner Telephone Terminal 20 generates the audio data, to be sent to Telephone Terminal 60, on the basis of the address information contained in the connection request received prior and transmits it.

Record 319 is the audio data sent from Partner Telephone Terminal 20 to Router 30. In the illustrated embodiment, the destination IP address field 312 contains the data "GA2," which is the global IP address of Router 30; the originator IP address field 313 contains the data "GA1," which is the global IP address of Partner Telephone Terminal 20; and the audio relay IP address field 314 contains the data "LA5," which is the local address of Telephone Terminal 61 that performs the address conversion.

Record 320 is the audio data sent from Router 30 to Telephone Terminal 61. In this audio data, the destination IP address field 312 contains the local address of Telephone Terminal 61, "LA5," and the audio data is sent directly to Telephone Terminal 61 without being forwarded to Gateway 50. The originator IP address field 313 contains the data "GA1," which is the global IP address of Partner Telephone Terminal 20, and the audio relay IP address field 314 contains the data "LA5," which is the local address of Telephone Terminal 61.

Record 321 is the audio data sent from Telephone Terminal 61 to Telephone Terminal 60. In this audio data, the destination IP address field 312 contains the data "LA4," which is the local IP address of Telephone Terminal 60; the originator IP address field 313 contains the data "LA5," which is the local IP address of Telephone Terminal 61, and because the address conversion function has been enabled, the audio relay IP address field 314 is the data "LA5," which is the local address of Telephone Terminal 61.

As illustrated, the audio data from Partner Telephone Terminal 20 is sent to Telephone Terminal 60 using the address conversion function of Telephone Terminal 61 without the intervention of Gateway 50.

FIG. 5 shows the IP data of an audio data sent from Telephone Terminal 60 to Telephone Terminal 61, then passing through Router 30, and to Partner Telephone Terminal 20.

Record 322 is the audio data sent from Telephone Terminal 60 to Telephone Terminal 61. The destination IP address field 312 contains the data "LA5," which is the local IP address of Telephone Terminal 61, and the originator IP address field 313 contains the data "LA4," which is the local IP address of Telephone Terminal 60. At that time, the audio relay IP address field 314 contains the data "LA5," which is the local address of Telephone Terminal 61.

Record 323 is the audio data sent from Telephone Terminal 61, after receiving the previous audio data, to Router 30. The destination IP address field 312 contains the data "GA1," which is the global IP address of Partner Telephone Terminal 20; the originator IP address field 313 contains the data "LA5," which is the local IP address of Telephone Terminal 61; and the audio relay IP address field 314 contains the data "LA5."

Record 324 is the audio data sent from Router 30 to Partner Telephone Terminal 20. The destination IP address field 312 contains the data "GA1," which is the global IP address of Partner Telephone Terminal 20; the originator IP address field 313 contains the data "GA2," which is the global IP address of Router 30; and the audio relay IP address field 314 contains the data "LA5."

Figure 6:
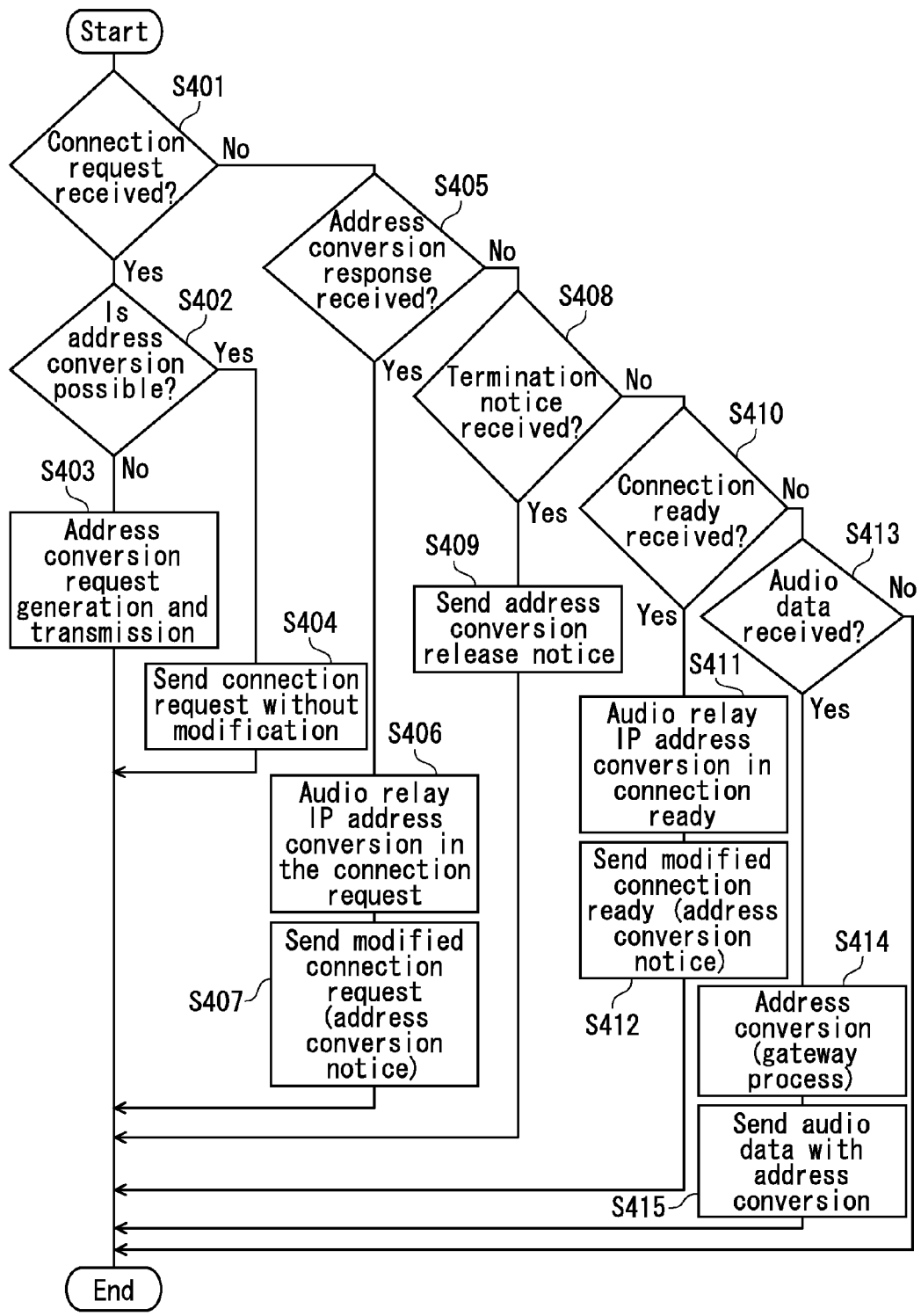
FIG. 6 is a flow chart showing the operation of the distributed processing gateway of an embodiment of the invention.

FIG. 6 is a flow chart showing the operation of Gateway 50 of an embodiment of the invention. Gateway 50 monitors the traffic sent and received from IP Network 10 at Gateway Controller 502 and waits for the reception of either a connection request (S401), an address conversion response (S405), a termination notice (S408), a connection ready (S410), or an audio data (S413).

Upon detection of a connection request (Yes for S401), Address Conversion Manager 503 determines if the gateway has the capacity to execute its address conversion function (gateway function) or not (S402).

If it is determined to have the capability to execute the address conversion process (Yes for S402), the connection request received is transmitted to Partner Telephone Terminal 20 (S404).

If it is determined not to have the capacity to execute the address conversion (No for S402), an address conversion request for SIP Server 40 is generated and sent (S403).

Upon detection of an address conversion response (Yes for S405), the address conversion response is analyzed to extract the originator IP address, which is converted to the audio relay IP address of the connection request (S406). The modified connection request is then transmitted to Partner Telephone Terminal 20 as an address conversion notice (S407).

Upon detection of a termination notice (Bye) (Yes for S408), Address Conversion Manager 503 instructs Address Conversion Request Transmitter 504 to transmit an address conversion release notice to Telephone Terminal 61 (S409), which performed the distributed address conversion part of the gateway function.

Upon detection of a connection ready (200 OK) (Yes for S410), Address Conversion Manager 503 instructs Address Conversion Execution Notifier 506 to send an address conversion notice. Address Conversion Execution Notifier 506 converts the audio relay IP address of the connection ready signal (200 OK) to the IP address of Telephone Terminal 61 (S411), and transmits the converted connection ready signal to Telephone Terminal 60 as an address conversion notice (S412).

Upon receiving the address conversion notice, Telephone Terminal 60 transmits the audio data to Telephone Terminal 61.

Upon detection of an audio data (Yes for S413), an address conversion between the local address and the global address is performed as a part of a normal function of a gateway (S414), and the audio data, whose address has been converted, is sent to the destination device (S415).

Figure 7:
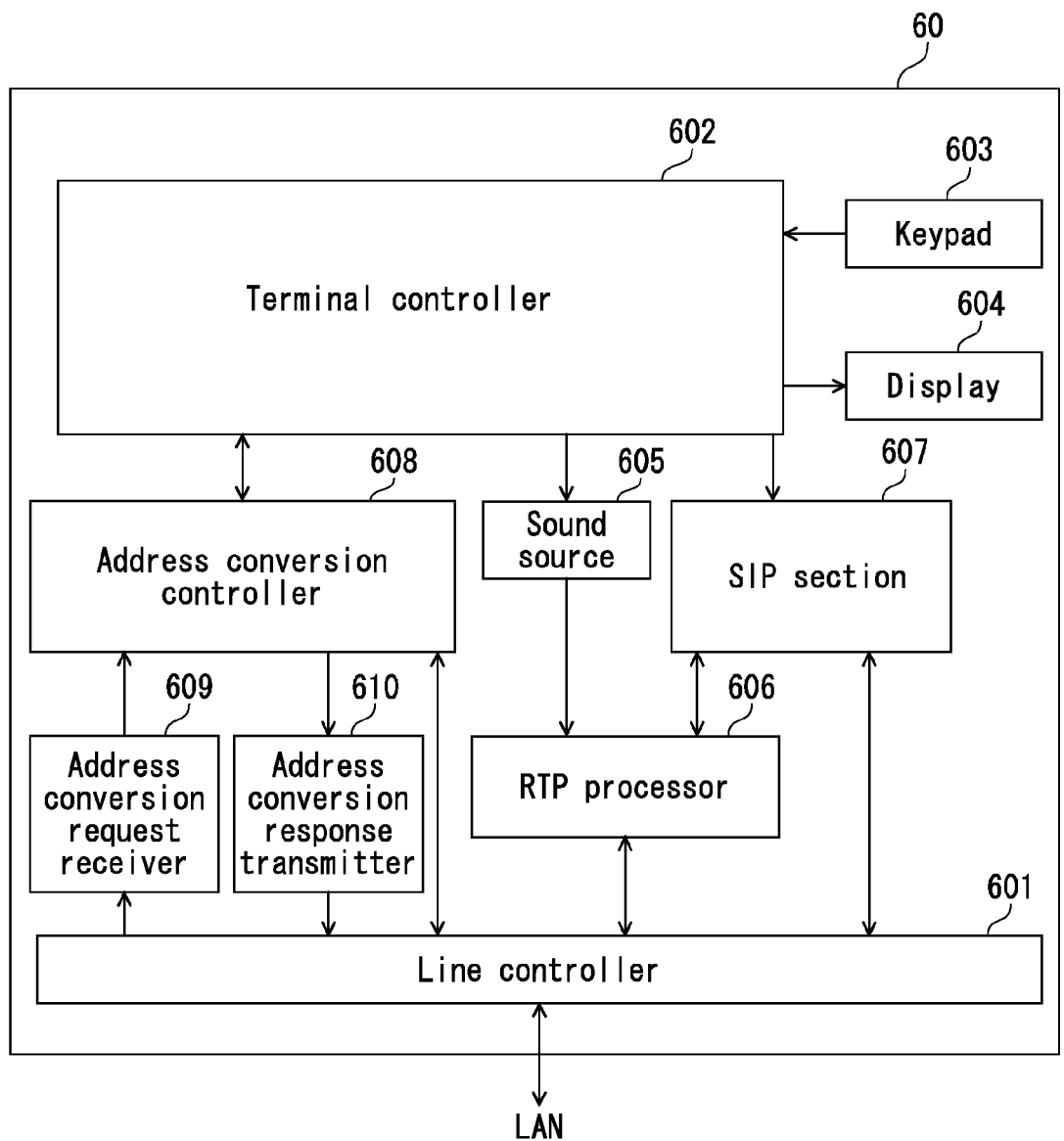
FIG. 7 is a block diagram showing the configuration of telephone terminals of an embodiment of the invention.

FIG. 7 is a block diagram showing the configuration of Telephone Terminal 60 and Telephone Terminal 61 of an embodiment of the invention.

Telephone Terminal 60 consists of Terminal Controller 602, which mainly controls the calling function; Keypad 603, which consists of pushbuttons and a hook switch; Display 604 including LCDs; and Sound Source 605, which consists of a microphone and a speaker. SIP Section 607 establishes the connection with SIP Server 40. RTP Processor 606, which converts audio data from Sound Source 605 into an IP data on the basis of the instruction of SIP Section 607 and transmits the converted data via Line Controller 601, provides the telephone functionalities of originating/accepting calls.

In the case of Telephone Terminal 61, which distributes part of the gateway function, Address Conversion Request Receiver 609 receives the address conversion request data from Gateway 50 and notifies it to Address Conversion Controller 608. The IP address of Partner Telephone Terminal 20 is attached to the received address conversion request data. If the address conversion process of another terminal is already in progress at the telephone terminal, Address Conversion Controller 608 concludes that the execution of address conversion is not possible, and if not, address conversion is possible. The address conversion response is then transmitted from Address Conversion Response Transmitter 610. Hereafter, Address Conversion Controller 608 performs address conversion for the multimedia data exchanged between Telephone Terminal 60 and Partner Telephone Terminal 20.

Figure 8:
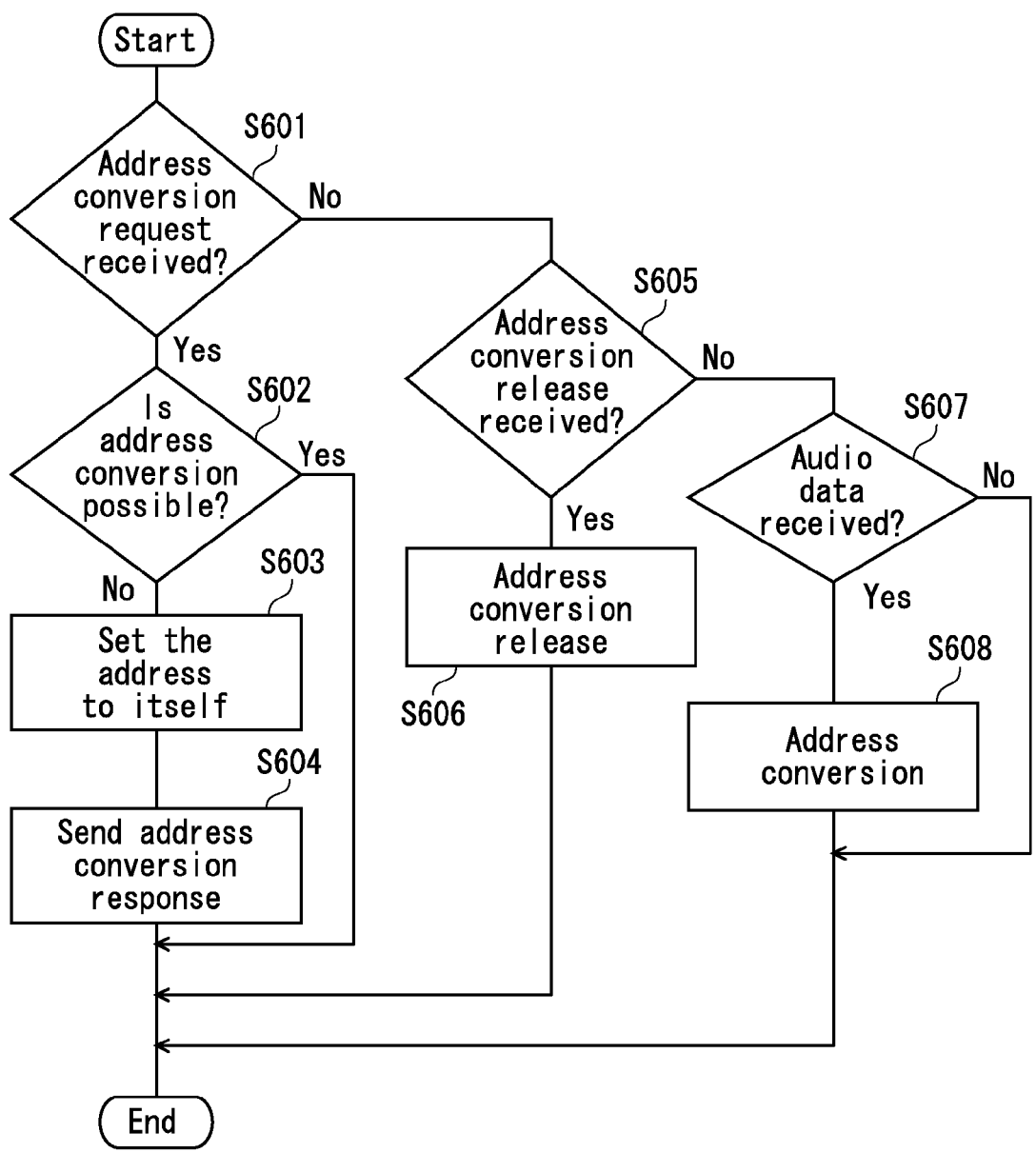
FIG. 8 is a flow chart showing the operation of telephone terminals of an embodiment of the invention.

FIG. 8 is a flow chart showing the operation of Telephone Terminal 61 of an embodiment of the invention. All communication functions of Telephone Terminal 61 other than the one of gateway are controlled at the Terminal Controller 602; therefore, the description of Telephone Terminal 61 is omitted in this flow chart. If an address conversion request from Gateway 50 is received at the Address Conversion Request Receiver 609 (Yes for S601), Address Conversion Controller 608 checks the execution status of the address conversion process of other telephone terminals. If no execution is carried out, i.e., it is possible to perform the task (Yes for S602), Address Conversion Controller 608 sets the IP address of its telephone terminal inside the address conversion response data (S603) and transmits the response to Gateway 50 from Address Conversion Response Transmitter 610 (S604).

With this operation, Telephone Terminal 61 enables its gateway function and performs distributed processing of address conversion. If an address conversion release is received (Yes for S605) instead of an address conversion request (No for S601), a cancellation of the gateway function (S606) is recognized by Address Conversion Controller 608. If normal data is received (Yes for S607) instead of an address conversion release (No for S605), the terminal performs an address conversion as a gateway operation (S608). If the data received is not normal (No for S607), it waits for the reception of the next data in the standby mode.

Figure 9:
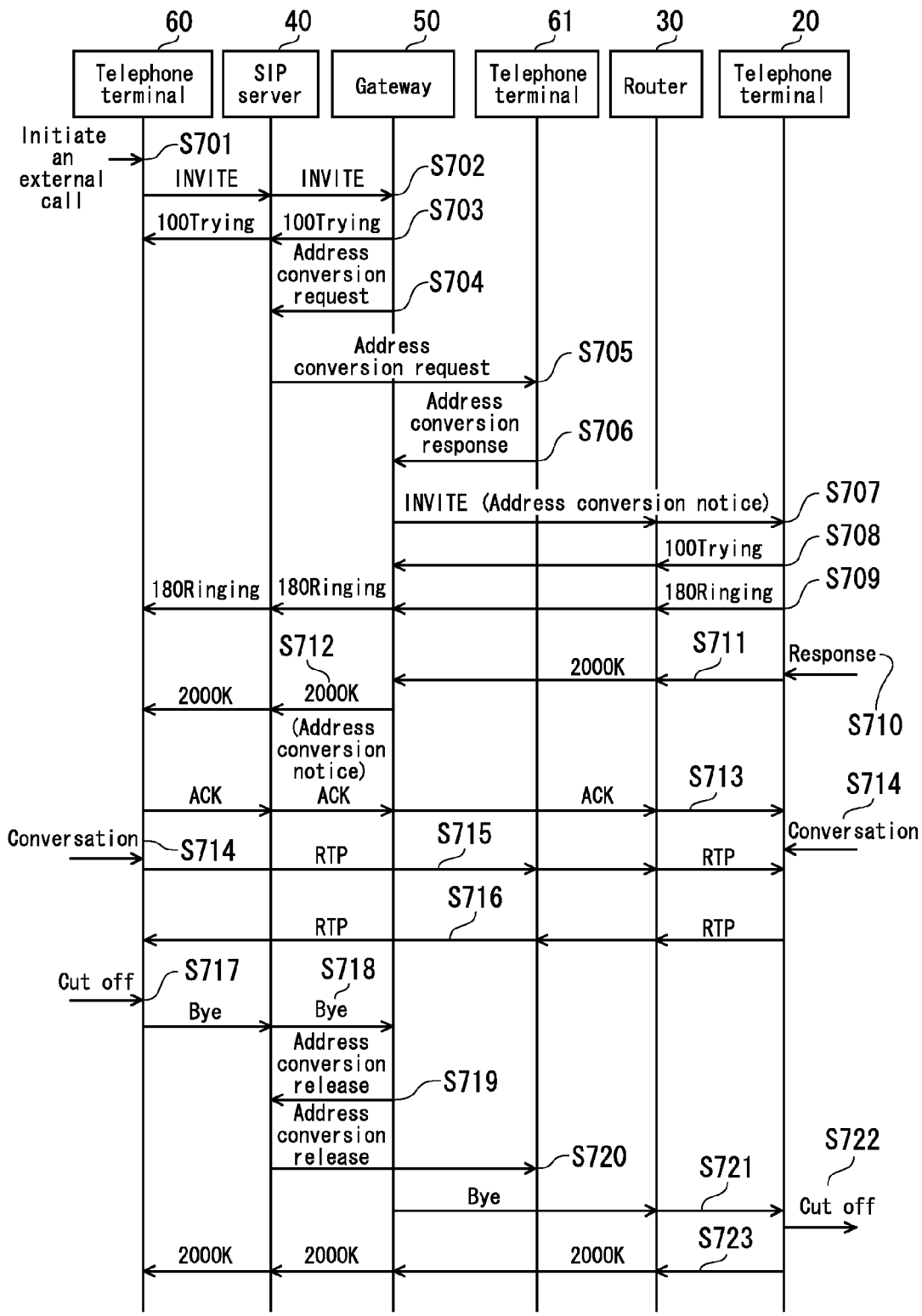
FIG. 9 is a sequence chart showing the operation of the distributed processing gateway of an embodiment of the invention.

FIG. 9 is a sequential diagram of the gateway operation of an embodiment of the invention. When Telephone Terminal 60 performs the operation of making an external call (S701), a connection request (INVITE) is sent to SIP Server 40 and the SIP Server then sends the connection request (INVITE) to Gateway 50 to pass it on to IP Network 10 (S702).

Gateway 50 sends the notice of processing (100 Trying) to Telephone Terminal 60 via SIP Server 40 (S703). Once a connection request (INVITE) is received, Gateway 50 sends an address conversion request to SIP Server 40 to distribute the address conversion part of the gateway function (S704). Here the address conversion request utilizes the INFO message of the SIP protocol and is sent to Telephone Terminal 61 via SIP Server 40 (S705). Telephone Terminal 61 sends an address conversion response to Gateway 50 if it is capable of performing the address conversion (S706).

Gateway 50 transmits the connection request (INVITE) sent from Telephone Terminal 60 to Partner Telephone Terminal 20 via Router 30 (S707). Here the IP address of Telephone Terminal 61, where it responded to the gateway distribution, is transmitted as an address conversion execution notice in place of the IP address of Gateway 50. As a result, Partner Telephone Terminal 20 recognizes Telephone Terminal 61 from the Session Description Protocol (SDP), which specifies the address for the audio data attached to the connection request, and hereafter, transmits all audio data to Telephone Terminal 61.

Partner Telephone Terminal 20 will not be requested to respond differently. All it has to do is to use the IP address listed in the SDP section of the audio data attached to the connection request (INVITE) sent by the above SIP server. Normally, the destination IP address for sending audio data of the conversation partner, such as the IP address of a gateway, is specified here. In this invention, IP address of Telephone Terminal 61, which distributes the gateway function, is used in place of the IP address of the aforementioned gateway. This embodiment defines separately the address conversion notice as the connection request with the aforementioned modified IP.

Partner Telephone Terminal 20 returns the notice of processing (100 Trying) to Gateway 50 (S708). Next, Partner Telephone Terminal 20 returns the ringing signal (180 Ringing) to Telephone Terminal 60 via Gateway 50 and SIP Server 40 (S709). When Partner Telephone Terminal 20 responds to the call initiated by Telephone Terminal 60 (S710), the successful call signal (200 OK) is sent to Gateway 50 (S711).

When the successful call signal (200 OK) is sent to Telephone Terminal 60 via SIP Server 40, Gateway 50 transmits the IP address of Telephone Terminal 61, which responded to the gateway distribution (address conversion notice) (S712). Telephone Terminal 60 returns the acknowledge signal (ACK) to Partner Telephone Terminal 20 via SIP Server 40 and Gateway 50 (S713). When Telephone Terminal 60 and Partner Telephone Terminal 20 go into conversation (S714), audio data (RTP) are sent to Telephone Terminal 61 that responded to the gateway distribution (S715).

Telephone Terminal 61 sends the audio data sent from Telephone Terminal 60 to Partner Telephone Terminal 20. The audio data (RTP) from Partner Telephone Terminal 20 is transmitted to Telephone Terminal 60 via Telephone Terminal 61 (S716). When Telephone Terminal 60 performs the operation of terminating the call (S717), the release signal (Bye) is sent to the gateway via SIP Server 40 (S718).

Gateway 50 sends an INFO message defined by the IP protocol to SIP Server 40 (S719) to notify Telephone Terminal 61, which responded to the gateway distribution, of the address conversion release (S720). Gateway 50 sends the shutdown signal (Bye) to Partner Telephone Terminal 20 to cut off the connection (S721).

Partner Telephone Terminal 20 reports the confirmation (200 OK) to Telephone Terminal 60 via Gateway 50 and SIP Server 40 (S723) once the cutoff operation (S722) is performed. Note that in case of an incoming call, the operation starts with Gateway 50's reception of the connection request (INVITE) sent by Partner Telephone Terminal 20 via Router 30.

Second Embodiment

Figure 10:
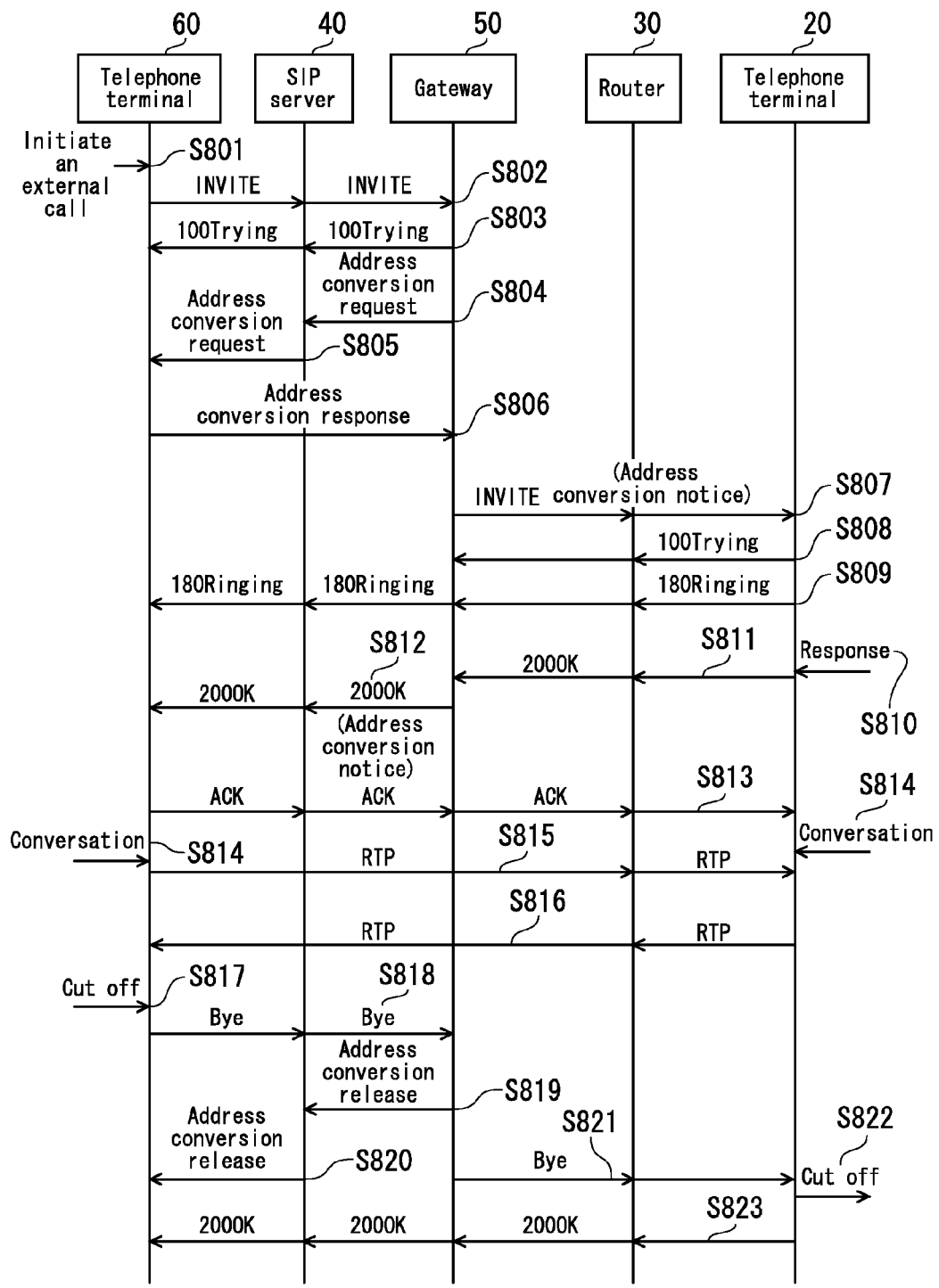
FIG. 10 is a sequence chart showing the operation of telephone terminals of an embodiment of the invention.

FIG. 10 is a sequence chart of the telephone terminals of another embodiment of the invention. Although this sequence is basically the same as the one shown in FIG. 9, distributed processing of the gateway function is performed by Telephone Terminal 60, which initiates or accepts telephone calls, rather than Telephone Terminal 61 to reduce the audio data processing load on Gateway 50.

Operations that are different from those shown in FIG. 9 are the ones that are executed when there exists no telephone terminal other than Telephone Terminal 60 that initiates or accepts calls to which Gateway 50 sends the address conversion request for distributed processing (S805). In other words, the address conversion request is sent to Telephone Terminal 60, which initiated or accepted a call (S806).

Upon receipt of an address conversion request, Telephone Terminal 60 enables the distributed processing of the gateway function by returning an address conversion response (S807). Next, when Gateway 50 sends a connection request (INVITE) to the telephone service SIP Server 40, the address of Telephone Terminal 60, instead of the address of Gateway 50, is sent as the address conversion execution notice.

Hereafter, the sequence is same as that shown in FIG. 9, and the exchange of audio data between Partner Telephone Terminal 20 and Telephone Terminal 60 is carried out with Telephone Terminal 60 operating as a gateway. The termination of the connection will follow a similar sequence, as shown in FIG. 9.

Although the address conversion request is sent to SIP Server 40, which selects Telephone Terminal 61 to relay the address conversion request in this embodiment, this application does not restrict the operation to this manner. For example, Gateway 50 may store, in its memory, information of other terminals that also have a gateway function, or even check whether the gateway function is used.

This invention provides the means for direct control and has the benefit of reducing the load on the SIP server.

DESCRIPTION OF SYMBOLS

10: IP network
20: Partner telephone terminal
30: Router
40: SIP server
50: Gateway
60: Telephone terminal
70: LAN
501: Line controller
502: Gateway controller
503: Address conversion manager
504: Address conversion request transmitter
505: Address conversion response receiver
506: Address conversion execution notifier
601: Line controller
602: Terminal controller
603: Keypad
604: Display
605: Sound source
606: RTP processor
607: SIP section
608: Address conversion controller
609: Address conversion request receiver
610: Address conversion request transmitter
GA1: Global IP address of Partner Telephone Terminal 20
GA2: Global IP address of Router 30
LA1: Local IP address of Router 30
LA2: Local IP address of Gateway 50
LA3: Local IP address of SIP Server 40
LA4: Local IP address of Telephone Terminal 60
LA5: Local IP address of Telephone Terminal 61

The invention claimed is:

1. A gateway in a telephone system, comprising:
a controller to receive a connection request from a first telephone terminal in the telephone system, the connection request to establish a connection between the first telephone terminal and a second telephone terminal in the telephone system, the connection request including an audio relay internet protocol (IP) address corresponding to the gateway; and
an address conversion manager module in communication with the controller, the address conversion manager module comprising a distributed processing function to:
send an address conversion request to a third telephone terminal in the telephone system to process address conversion for stream-type packet data, such as audio and video data, in connection with the gateway; and
notify an address of the third telephone terminal, which performs the address conversion of the stream-type packet data, to the first telephone terminal of the stream-type packet data if the third telephone terminal to which the address conversion request is sent accepts the address conversion request,
wherein the controller, if the third telephone terminal to which the address conversion request is sent accepts the address conversion request, replaces the audio relay IP address in the connection request with an IP address of the third telephone terminal before sending the connection request to the second telephone terminal.

2. A telephone communication terminal in a telephone system, comprising:
a terminal controller to control calling functions of the telephone communication terminal;
a session initiation protocol (SIP) module in communication with the terminal controller, the SIP module to establish and terminate SIP calls through the telephone system;
a real time transport protocol (RTP) processor to convert audio to and from internet protocol (IP) data under instructions from the SIP module; and
an address conversion controller in communication with the terminal controller, the address conversion controller to:
receive an address conversion request sent by a gateway in the telephone system, the address conversion request requiring the telephone communication terminal to convert addresses of stream-type packet data such as audio and video;
respond to the gateway after receiving the address conversion request by indicating whether the requested process can be performed by the telephone communication terminal; and
upon sending the response indicating that it is possible, perform address conversion for stream-type packet data specified by the gateway.

3. The gateway of claim 1 wherein the requested address conversion comprises converting between a global IP address and a local area IP address for the stream-type packet data.

4. The telephone communication terminal of claim 2 wherein the requested address conversion comprises converting between a global IP address and a local area IP address for the stream-type packet data.

* * * * *